July 20, 1926.                                                          1,592,983
A. A. LOWNES
MOTION PICTURE TRANSPARENCY
Filed Oct. 9, 1922
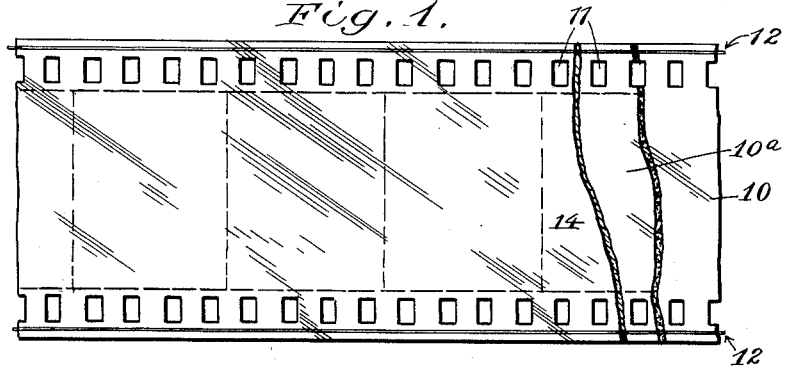
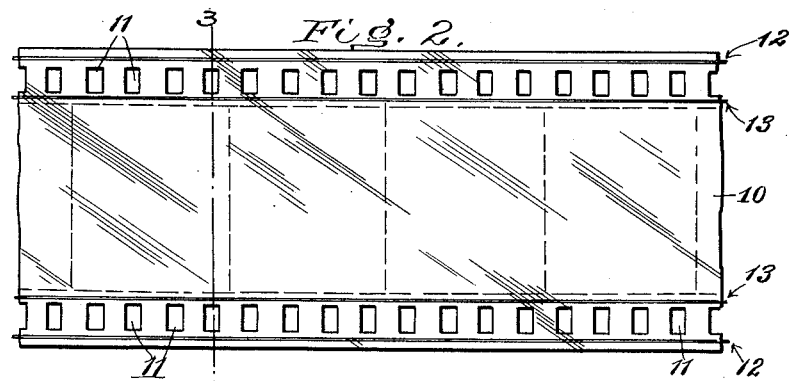
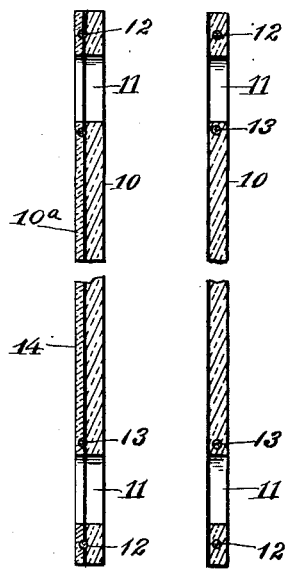
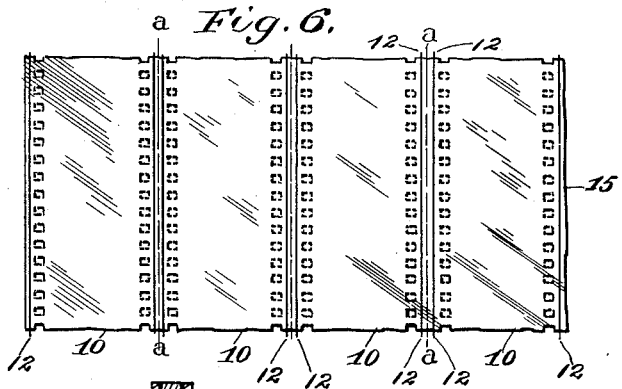
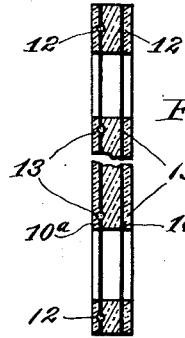
Inventor
Allan A. Lownes
by Conrad (signature)
his Atty.

Patented July 20, 1926.

1,592,983

UNITED STATES PATENT OFFICE.

ALLAN A. LOWNES, OF NEW YORK, N. Y., ASSIGNOR TO DURA FILM PROTECTOR CO. INC., OF NEW YORK, N. Y., A CORPORATION OF NEW YORK.

MOTION-PICTURE TRANSPARENCY.

Application filed October 9, 1922. Serial No. 593,251.

My invention relates to improvements in motion picture transparencies and the same has for its object more particularly to provide a transparency which is more durable and less liable to injury as a result of repeated use than those now commonly employed.

Further, said invention has for its object to provide a transparency having its longitudinal edge portions, which are perforated, so reinforced or protected that the danger of injury thereto as a result of repeated use, will be materially lessened.

Further, said invention has for its object to provide a motion picture transparency which is so constructed that the normally weak perforated longitudinal edge portions will be greatly reinforced or strengthened without materially increasing the thickness of the film.

Further, said invention has for its object to provide a motion picture transparency with means incorporated into the same or formed integrally therewith, which will serve to reinforce and protect said transparency without unduly increasing its thickness, or diminishing its flexibility.

Further, said invention has for its object to provide a motion picture transparency having its longitudinal edges adjacent to the inner and the outer ends of the perforations therein reinforced by a plurality of members arranged longitudinally of the film, and said members and the photographic surface of the film covered and protected by a transparent coating.

Other objects will in part be obvious, and in part be hereinafter pointed out.

To the attainment of the aforesaid objects and ends, my invention consists in the novel details of construction, and in the combination, connection and arrangement of parts hereinafter more fully described and then pointed out in the claims.

In the accompanying drawings—

Figure 1 is a face view showing a portion of one form of motion picture transparency constructed according to, and embodying my said invention;

Fig. 2 is a similar view showing a modified construction;

Fig. 3 is an enlarged transverse section of the same on the line 3—3 of Fig. 2;

Fig. 4 is a similar view showing a modified form of reinforced transparency;

Fig. 5 is a similar view showing a motion picture transparency provided upon each of its surfaces with a photographic film, and protective coatings therefor, and Fig. 6 is a face view showing the method of simultaneously producing a plurality of reinforced film strips which are subsequently perforated as indicated by dotted lines.

In said drawings 10 designates a support formed as a web or relatively narrow strip of film of transparent celluloid or other suitable material and provided along each of its longitudinal edges with equally spaced rectangular apertures 11 which are adapted to receive the teeth or spurs of the sprocket wheel of a camera or of a projecting apparatus.

One surface or side of the web or strip 10 is provided with a photographic film $10^a$ of the usual form.

In order to strengthen and protect the web or strip 10 along its perforated longitudinal edges, I apply longitudinal reinforcing members 12, 12 to the sensitized side of the web or strip 10 intermediate the longitudinal edges of said web or strip and the outer ends of the apertures 11. Where greater strength or protection is necessary or desirable, each side of the web or strip 10 adjacent to the inner ends of the apertures may be provided with an additional reinforcing member 13 as shown at Fig. 2.

It will be readily apparent that as the picture transparency consists essentially of a support formed of pliable material, such as celluloid, and is subject to repeated bending or curving in the course of repeated and continued use, the reinforcing means must be formed of a material which is thin, strong and of such structure that the same will conform readily to the support during its flexing movements without danger of breaking or rupturing. I have found that a reinforcing member in the form of a fibrous thread composed of a plurality of fine strands is best adapted to attain the object and end in view. By preference I form the said reinforcing members of silk threads 12, 13 laid longitudinally of the support. As the said reinforcing members are relatively thin and strong, they may be readily incorporated into, or formed integrally with said support.

In reinforcing an ordinary motion picture transparency, the exposed sensitized photographic film is first developed and fixed in the usual manner, and thereupon the reinforcing members 12, or 12 and 13 as the case may be are simultaneously applied to the picture side of the film, and the same then passed through a suitable machine whereby a transparent protective coating 14 of celluloid, in liquid form, is applied to said picture side of the film and the reinforcing members thereon. The celluloid coating 14 is then permitted to harden, and as a result the web 10, longitudinal reinforcing members 12, or 12 and 13, as the case may be, and the coating 14 become an integral or unitary structure. The coating 14 and longitudinal reinforcing members 12, 13 serve to protect the edges of the web or strip against breakage or injury, and the coating 14 alone serves to protect the photographic film on the web or strip against scratching, defacement, or other injury.

In producing a reinforced transparency before a picture has been developed thereon, the film body or support may be formed as a wide band 15, as shown at Fig. 6, which is subsequently cut into a number of narrow widths to form the picture films or strips 10. In such case, the said support 10 while being formed, may have incorporated directly into the same a series of reinforcing members 12, 13, as shown at Fig. 4, and the band subsequently provided upon one side with a sensitized coating, and then slit lengthwise along the lines a—a into a plurality of strips, and perforated along their longitudinal edges. In this construction, as shown at Fig. 4, it will be noted the reinforcing members 12, 13 are incorporated within the body of the film strip and beneath the sensitized coating thereon, while in the construction illustrated at Figs. 1 and 2, the reinforcing members are disposed between the face of the film strip and the protective coating or covering 14 thereon. Where the protective coating is a relatively thin one the reinforcing members 12, 13 may extend more or less into said protective coating.

It will of course be understood that the protective coating 14, may consist of any suitable transparent substance capable of being applied to, and adhering to the support 10 and become integral with said support and the reinforcing members 12, 13. By preference, the protective coating is formed of substantially the same material as that of which the support is formed in order that the same will become integral or unitary therewith, such as cellulose acetate, or a nitro cellulose.

Further, it will be obvious that in any case where the transparent support 10 is provided on both of its surfaces with photographic films 10ª, that both sides of said support may be provided with protective coatings 14, and one or both sides, as desired, protected by longitudinal reinforcing members as 12, 13, as hereinabove described.

Having thus described my said invention what I claim and desire to secure by Letters Patent is—

1. A motion picture transparency comprising a transparent support adapted to receive a photographic film, a fibrous reinforcing medium lying upon and extending longitudinally of said support, and means covering said medium for securing the same to said support, substantially as specified.

2. A motion picture transparency comprising a transparent support, a photographic film thereon, a fibrous reinforcing medium, and a protective coating for said photographic film serving to secure said reinforcing medium in position upon said support, substantially as specified.

3. A motion picture transparency comprising a transparent support provided adjacent to its longitudinal edges with perforations, a photographic film on said support, fibrous reinforcing members on said support adjacent to said perforations, and a protective coating for said photographic film serving to secure said reinforcing members in position upon said support, substantially as specified.

4. A motion picture transparency comprising a transparent support provided adjacent to its longitudinal edges with the perforations, a photographic film upon said support, fibrous reinforcing members arranged longitudinally of said support adjacent to said perforations, and a protective coating on said support serving to protect said photographic film and to secure said reinforcing members upon said support, substantially as specified.

5. A motion picture transparency comprising a transparent support, a protective coating for said support, and reinforcing members interposed between said support and said protective coating, substantially as specified.

6. A motion picture transparency comprising a transparent support having perforations adjacent to each of its longitudinal edges, a protective coating for said support, and reinforcing members adjacent to said perforations interposed between said support and said protective coating, substantially as specified.

7. A motion picture transparency comprising a transparent support having perforations adjacent to each of its longitudinal edges, a protective coating for said support, and reinforcing members interposed between said support and said protective coating, the whole formed as an integral structure, substantially as specified.

8. A motion picture transparency comprising a transparent support having perforations adjacent to its longitudinal edges, a photographic film upon one side of said support, a protective coating for said photographic film, and longitudinal reinforcing members imbedded in said transparency intermediate said support and said protective coating, substantially as specified.

9. A motion picture transparency comprising a transparent support having perforations adjacent to its longitudinal edges, a photographic film upon one side of said support, a protective coating for said photographic film, and longitudinal reinforcing members imbedded in said transparency intermediate said support and said protective coating, the whole being combined to form an integral structure, substantially as specified.

10. A motion picture transparency comprising a transparent support having perforations adjacent to its longitudinal edges, a photographic film upon one side of said support, a transparent protective coating for said photographic film, and longitudinal reinforcing members disposed intermediate said support and said protective coating and skirting one edge of the perforations arranged adjacent to each edge of said support, substantially as specified.

11. A motion picture transparency comprising a transparent support having perforations adjacent to its longitudinal edges, a photographic film upon one side of said support, a transparent protective coating for said photographic film, and longitudinal reinforcing members disposed intermediate said support and said protective coating and skirting one edge of the perforations arranged adjacent to each edge of said support, the whole being combined to form an integral structure, substantially as specified.

12. A motion picture transparency comprising a transparent support having a row of perforations adjacent to each of its longitudinal edges, a photographic film upon one side of said support, a transparent protective coating for said photographic film, and longitudinal reinforcing members disposed intermediate said support and said protective coating and arranged along the opposite ends of the rows of perforations arranged adjacent to each edge of said support, substantially as specified.

13. A motion picture transparency comprising a transparent support provided adjacent to its longitudinal edges with perforations, a photographic film upon said support, fibrous reinforcing members arranged longitudinally of said support adjacent to said perforations, and a protective coating on said support formed of substantially the same material as said support serving to protect said photographic film and to secure said reinforcing members upon said support, substantially as specified.

14. A motion picture transparency comprising a transparent celluloid support having perforations arranged adjacent to its longitudinal edges, a photographic film upon one side of said support, a transparent celluloid protective coating for said celluloid support and for said photographic film, and fibrous reinforcing members disposed intermediate said support and said coating adjacent to the ends of the perforations along the edges of said support, the whole being combined to form an integral structure, subsequently as specified.

15. A moving picture transparency comprising a transparent support provided adjacent to its longitudinal edges with perforations, photographic films upon the opposite sides of said support, fibrous reinforcing threads arranged longitudinally of said support adjacent to said perforations, and a protective coating formed integrally with said support for each of said photographic films, substantially as specified.

16. A moving picture transparency comprising a transparent support provided adjacent to its longitudinal edges with perforations, photographic films upon the opposite sides of said support, fibrous reinforcing members on said support extending longitudinally thereof adjacent to said perforations, and a protective coating for each of said photographic films, the whole forming a unitary structure with said members imbedded therein and covered thereby, substantially as specified.

Signed at the city of New York, in the county and State of New York, this 22d day of August one thousand nine hundred and twenty-two.

ALLAN A. LOWNES.